April 25, 1939.  C. R. STUNTZ  2,155,453
PROCESS OF PREPARING FRUIT PRODUCTS
Filed Nov. 23, 1936  2 Sheets-Sheet 1
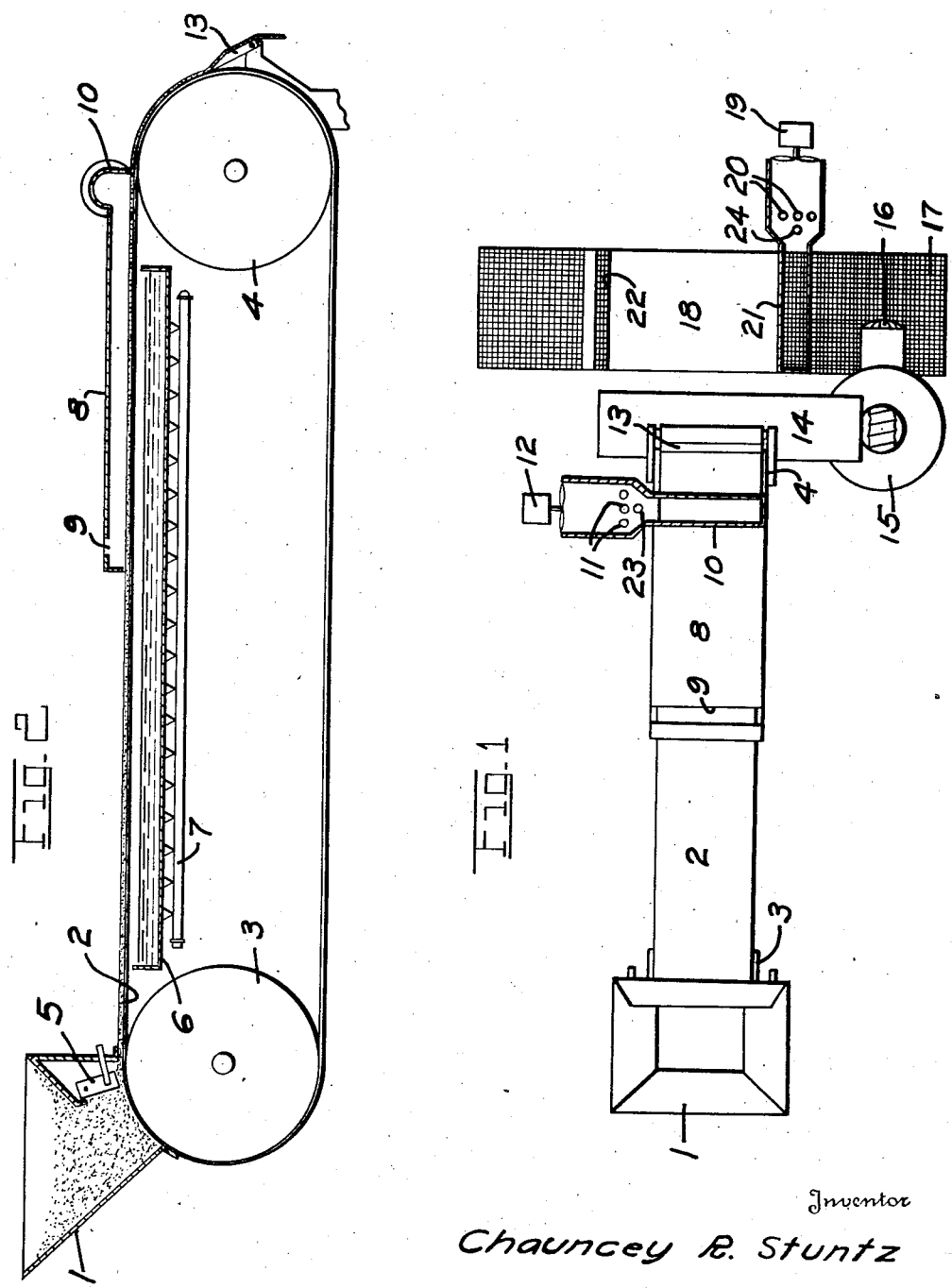
Inventor
Chauncey R. Stuntz
By Charles L. Reynolds
Attorney

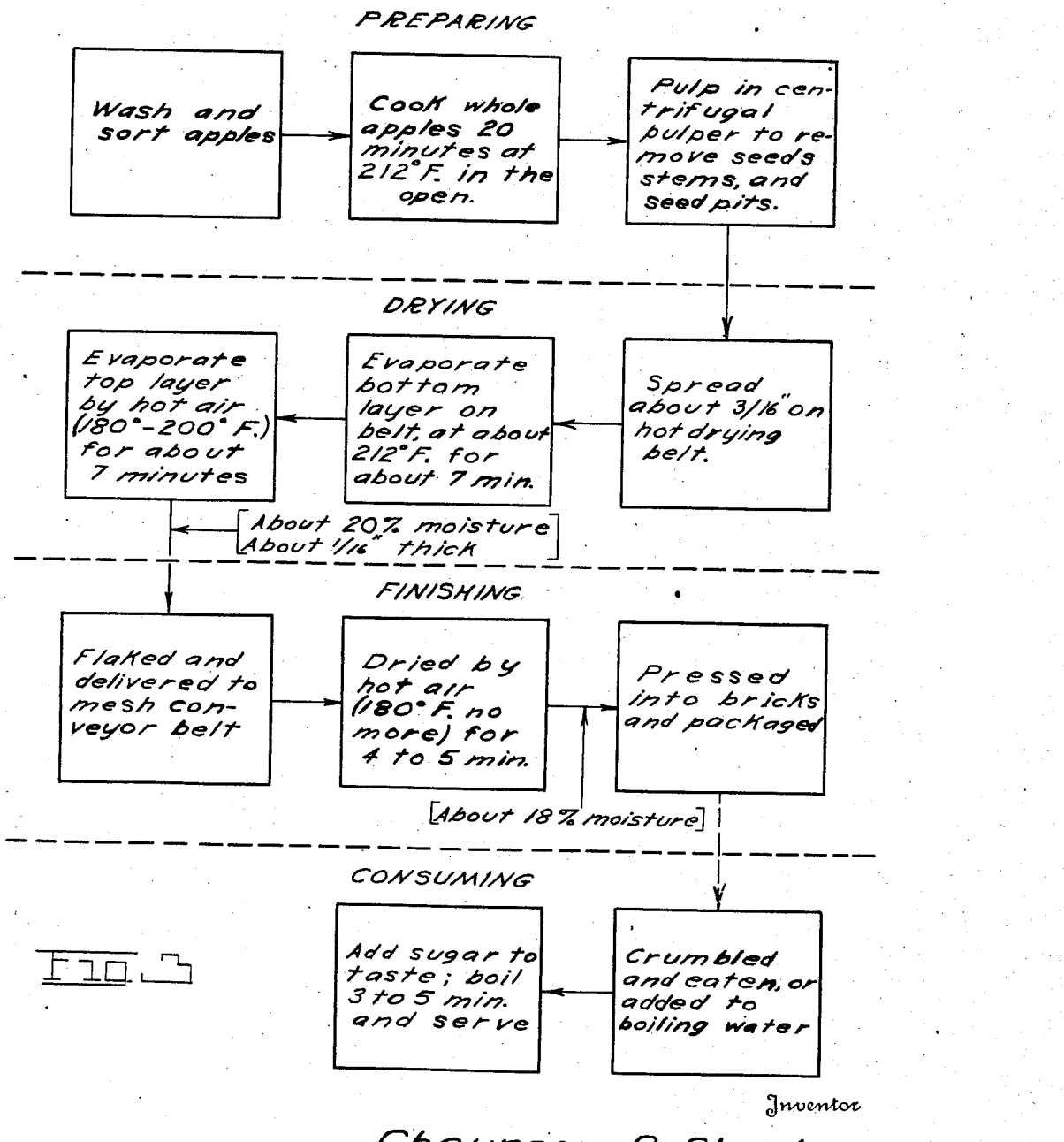

Patented Apr. 25, 1939

2,155,453

UNITED STATES PATENT OFFICE 2,155,453

PROCESS OF PREPARING FRUIT PRODUCTS

Chauncey R. Stuntz, Seattle, Wash.

Application November 23, 1936, Serial No. 112,244

13 Claims. (Cl. 99—204)

My invention relates to the art of dehydrating and preserving fruit, vegetables and the like. My invention will be described in conjunction with the dehydration of apples, but as is recognized in the prior art, for instance in patent to Sartakoff, No. 1,908,489, such a process is applicable to various other fruits and to some vegetables, hence in the specification and claims the terms "fruit" or "apples" are to be understood as including all fruits and vegetables as are suitable for dehydrating by my process, which can form a product such as that to be described. For example, my process has been used successfully with apples, pears, prunes, and pumpkins.

The present invention in particular is an improvement upon the process disclosed in Shepard Reissue Patent No. 14,757. The product made under the Shepard patent can be kept and used for years, but it was found to have certain drawbacks which rendered it commercially impracticable. My present invention is concerned with the elimination of these drawbacks and the making of a product similar to the product of the Shepard patent, which will possess all the advantages of the Shepard product and which will eliminate the disadvantages. Among these disadvantages are the following: The final product is a flaked film of dried apple pulp; such a film forms a cohesive mass or film when heated, and particularly in that portion which contacts the heated surface, which cohesive mass per se or through its entrapment of steam constitutes an insulator and absorbs the greater part of the heat from the heated surface and prevents it from reaching the remainder of the mass; because of this characteristic it tends to become too highly heated in the portion adjacent the heating surface of the kettle in which the pulp is dried, before the remainder of the pulp is sufficiently dehydrated. This requires an excess of heat and considerable stirring, with consequent undue expenditure of power because the cohesive mass is difficult to stir. But more important, it overheats the mass of pulp, thereby not only destroying the vitamins and mineral salts present in the fresh fruit, but darkening the final product to a point where it is unpalatable or unattractive in appearance. While the darkened product might perhaps be bleached, this would entail additional expense, and would further alter the taste of the final product. The taste of this final product as made by the Shepard process departed considerably from the taste of the fresh fruit, and the taste of sauce made from the dried flakes was quite dissimilar from the taste of sauce made from fresh apples. These disadvantages I have overcome by my invention.

According to my process the final product is light in color, has not been overheated and hence retains a high percentage of the vitamins and mineral salts present in the fresh fruit, and when made up as a sauce in water it tastes very similar to sauce made from fresh apples. The dried and flaked product when eaten has a taste which is superior, as is its appearance, to prior products which have been too long cooked or heated to too high a degree, or which have had to be treated with a bleaching agent, as are dried apples.

Furthermore, according to my process, a minimum of heat and power is required, and hence the process and the final product can compete commercially with dried apples.

My invention, therefore, comprises the novel process and the novel steps of this process, as will be hereinafter explained and defined, and as is indicated in the accompanying drawings.

The accompanying drawings show diagrammatically the apparatus and the steps of my process.

Figure 1 is a general plan view of apparatus which may be employed in carrying out my process.

Figure 2 is a side elevation of the drying belt and associated elements, diagrammatically shown.

Figure 3 is a diagram of the successive steps of my process.

The several steps of my process are illustrated graphically in Figure 3. A preliminary step of preparation is necessary with most fruits, as the fruit, apples for example, is usually of the cull variety—wormy, misshapen, poorly colored, or having various defects, and as it comes from the orchard it bears a spray residue. The fruit is washed to remove the spray residue, and sorted, for instance to eliminate wormy apples. The cooking is carried on for a sufficient time, in an open kettle or in any suitable manner, that the apples are reasonably softened and/or disintegrated; twenty minutes will normally be sufficient. In this connection, any pulping process, as set forth in the Sartakoff patent, may be employed. They are then delivered to a centrifugal pulper or similar device which removes the seeds, stems, seed pits, and any large pieces of skin, and which preferably breaks up the skins (of apples or like fruit), or so much thereof as can be readily disintegrated, into small bits, which are distributed throughout the resultant strained pulp, for the skin contains values which are desirable in the final product. Of course, the skin of different apples is differently colored, and red-skinned apples will give the final product a reddish tinge, while yellow- or green-skinned apples will give the final product a lighter color.

After these steps of preparation have been completed the drying operation begins, and my invention is particularly concerned therewith. The final strained pulp is spread in a thin layer, perhaps $\frac{1}{16}$ of an inch thick, continuous throughout, and this is preferably accomplished by apparatus such as is shown in Figures 1 and 2. The pulp may be delivered, for example, to a hopper 1, whence it is delivered to a belt 2, preferably of stainless steel, passing over pulleys 3 and 4. As a guide to understanding the machine and the process it may be stated that the belt 2 is 36 inches wide and the axes of the pulleys 3 and 4 are 60 feet apart, in a commercial machine. The belt is slowly advanced, by mechanism not shown, to carry the pulp from the hopper 1 toward the opposite end of the belt. It is spread at the hopper to the required thickness by a doctor bar 5 or like element, and as soon as practicable after it emerges from the hopper the layer of pulp is heated. The belt is warm from previous passages through the heated zone. This heating may be accomplished by disposing beneath the upper run of the belt 2 a tank 6, containing water and suitably heated, as by the burner diagrammatically indicated at 7. If the water within the tank is kept boiling, yet the tank is left open to the atmosphere, its temperature will be about 212° F., and the thin layer of pulp on the belt 2 will be raised to and maintained at about this temperature. Any other suitable means may be employed to supply heat at a controlled temperature. The speed of the belt may be regulated in such a way, and the apparatus may be so arranged, that for approximately the first seven minutes the layer is heated only from the bottom. The effect of this is to drive out the water, especially from the lower portion of the layer of pulp, adjacent the hot belt. The moisture driven off rises through the upper portion of the layer, which tends to remain more fluid, and the lower portion, being closer to and contacting the hot belt, begins to cohere, or become gelatinous, and at the end of seven minutes has cohered into a mass of such consistency that moisture no longer passes readily through it. The upper portion of the layer, however, remains more fluid, and has not as yet begun to cohere, so that the moisture from below still passes freely through it, but if it were attempted to continue the heating from below until the upper portion of the layer begins to cohere, the lower portion of the layer would by that time have become overheated and would be darkened in color and changed in taste. In addition a considerable additional amount of heating would be required, and probably a higher temperature would be necessary, because of the increasing resistance of the gelatinous or cohering mass of pulp to passage of water or steam through it, and due perhaps to the entrapment of steam within minute pockets in the cohesive mass, and consequent increase of pressure and temperature within and throughout the mass.

Accordingly, the next step is to heat the layer of pulp from above, and in such a way that the moisture is free to leave it. This may be accomplished by conveying it, still upon the belt 2, beneath a hood 8, having a discharge opening 9 at one end and an inlet 10 at the opposite end for delivery of hot air thereto. As seen in Figure 1, the air may be heated by any suitable means, such as heating elements or coils 11, disposed in the inlet 10, a fan 12 blowing air into the inlet 10 and over the heating elements 11. This air may be kept at a temperature up to 212° F., but since it is desirable to keep the belt and the now more coherent lower part of the pulp layer as warm as it was in the first stage, by extending the trough 6 beneath the belt in this second stage of the drying, and it becomes difficult to avoid some overheating if it is attempted to heat the air as high as 212°, I prefer that the air be heated only to a temperature from 180° to 200° F. Its temperature may be regulated suitably, as by the regulator or thermostat 23. Unless the temperature of the film, during this second stage, is kept elevated, by heating from below, the moisture eliminated from the upper part tends to penetrate the lower part. This second stage requires about seven minutes, and upon its completion the pulp has shrunk to a thickness of about $\frac{1}{16}$ inch, and contains about 20% to 22% moisture. It will now be apparent that the initial thickness or thinness of the pulp film depends upon the cohesive characteristics of the particular fruit or pulp, as for example, the initial water content of the pulp, and its resistance, during drying, to passage of moisture. The film should be of such thinness that the moisture can be eliminated readily, and approximately uniformly from top to bottom, by the process described, and down to a proper moisture content (having in mind the possibility of further drying after flaking, an optional step hereafter described). For economy the film should be of such thickness, initially, as will most quickly utilize the supply of pulp. The thickness of film selected will in most instances be a compromise between these considerations, but tending towards thinness, in order to insure adequate drying intermediate the top and bottom portions of the film, though still leaving some drying to be subsequently accomplished if the dried film is not to be the final product. The moisture content of the dried film will vary in accordance with the amount of water used in the first cooking and in accordance with the moisture content of the particular fruit being employed, as well as the thickness and treatment of the film. However, the film has been dried sufficiently that it is a cohesive, comparatively thin film, which can be removed by a scraper 13 from the belt, and it is delivered, as, for example, by the medium of a belt 14, to a flaker. However, the dried film may in itself constitute the final product, and the novel features of my invention are concerned primarily with the evaporation, first by heating from below, and then by heating from above, accomplishing the heating while the pulp is spread in a thin continuous layer, and preferably accomplishing the heating from above by passage of warm air over the upper surface of such a layer.

Assuming that the product is to be flaked, however, it is delivered by the belt 14 to a flaker 15, where by special knives 16 the film is cut into small flakes. It is then delivered to a mesh belt 17, and it should then be passed through a hood or tunnel, as 18, where warm air is delivered to, over or through the flakes and belt to further dry the flakes. In the first and second stages of the drying step the layer, it will be understood, is dried first from below and then from above, and yet the center may not be quite as well dried as the upper and lower surfaces, and the central portion of the film, intermediate the top and bottom, is exposed when the material is flaked. In order that it may be substantially uniformly dried throughout, and dried to a moisture content below that required for fermentation, the subsequent flaking and drying process is preferable, and I consider this a secondary feature of my invention. Thus hot air at a temperature not in excess of 180° F. is delivered to the hood 18 by a fan 19, past heating elements 20 and the temperature regulator 24 to the inlet 21 of the hood, and the air emerges from the hood through the mesh belt or from an outlet 22 at the opposite end from the inlet 21. The flakes by this time are dried to a point where they contain about 18% moisture or less, and upon delivery from the belt 17 they may be pressed lightly into bricks and packaged.

In this form they are light brown in color, and pleasing in appearance. They possess the vitamins and mineral salts present in the fresh fruit to a high degree, and can be kept in various climates for long periods of time.

When the flaked product is to be consumed it crumbles easily, and may be eaten this way, or the crumbled product may be added to boiling water, and dissolves or disperses readily. With sugar added to taste it is ready for the table with from three to five minutes of boiling, and this produces a sauce similar in taste and palatability to the sauce made from fresh fruit. It is also useful for incorporation in other food products, as in crackers or cookies, or as an ingredient in confections.

The term "vegetable material" in the claims is intended to include all such fruits and vegetables and their pulps which contain a substance tending to jell upon heating, thereby hindering the escape of moisture.

What I claim as my invention is:

1. A process of dehydrating various vegetable materials having varying tendencies to gel when heated, which in drying forms a cohesive film, which includes the steps of spreading the pulp in a thin layer that is of sufficient thickness with regard to the gelling characteristics of the particular fruit being treated, that the under layer thereof, when heated, will gel before the upper layer has lost its pulp-like consistency, heating the same from below to drive off moisture from the lower portion of the layer, through the upper portion thereof, and thereafter passing warm air over the upper surface of the layer to remove moisture therefrom.

2. A process of dehydrating various vegetable materials having varying tendencies to gel when heated, which in drying forms a cohesive film, which includes the steps of spreading the pulp in a thin layer that is of sufficient thickness with regard to the gelling characteristics of the particular fruit being treated, that the under layer thereof, when heated, will gel before the upper layer has lost its pulp-like consistency, heating the same from below at a temperature not exceeding about 212° F. until the lower portion of the layer coheres, thereby to drive off moisture from the lower portion of the layer through the as yet noncoherent upper portion, and thereafter heating the upper portion of the layer at a like temperature, to remove moisture therefrom, until the upper portion similarly coheres, meanwhile maintaining the lower portion at a drying temperature, to prevent its impregnation by moisture from the upper portion.

3. A process as in claim 2, wherein each heating step is conducted for about seven minutes.

4. A process of dehydrating vegetable materials, which in drying forms a cohesive film, which includes the steps of spreading the pulp in a continuous layer approximately $\frac{3}{16}$ inch thick, heating the same from below at a temperature of about 212° F. for approximately seven minutes, and thereafter heating the same from above by passage of warm air thereover at a similar temperature and for a similar period, meanwhile maintaining the lower portion at a drying temperature to prevent impregnation thereof with moisture from the upper portion.

5. A process of dehydrating apple pulp, which in drying forms a cohesive film, which includes the steps of spreading the pulp in a continuous layer approximately $\frac{3}{16}$ inch thick, heating the same from below at a temperature of about 212° F. for approximately seven minutes, and thereafter heating the same from above by passage of warm air thereover at a similar temperature and for a similar period, meanwhile maintaining the lower portion at a drying temperature to prevent impregnation thereof with moisture from the upper portion.

6. A process of dehydrating a fruit pulp which, upon heating, tends to become gelatinous, thereby hindering escape of moisture, which process comprises the steps of spreading the pulp upon a surface in a layer which is of such thickness that it will initially permit ready escape of moisture from the bottom through the top, but after initial heating from below will become gelatinized in its lower portion more greatly than in its upper portion, heating the surface and the pulp thereon to remove moisture from such lower portion, thereafter heating the upper portion of the layer to remove moisture therefrom, meanwhile maintaining the drying temperature in the lower portion, to prevent impregnation of the dried lower portion by moisture from the upper portion.

7. A process of dehydrating and concentrating a vegetable material, which contains a substance tending to gel upon heating, and thereby to lock in the moisture, which process comprises the steps of producing a pulp of such fruit, spreading such pulp upon a surface in a homogeneous, continuous film of a thickness such that the under layer thereof, when heated from below, will gel before the upper layer has lost its pulp-like consistency, but sufficiently thin that the upper layer may be dried and gelled by heat applied from above, thereby substantially gelling the entire film, and applying heat from below to heat the surface and the under layer, to drive off moisture from such under layer through the still pulp-like upper layer, and subsequently applying heat to the upper layer of the film, to eliminate moisture from such upper layer as the latter gels.

8. A process of dehydrating and concentrating a vegetable material, which contains a substance tending to gel upon heating, and thereby to lock in the moisture, which process comprises the steps of producing a pulp of such fruit, spreading such pulp upon a surface in a homogeneous, continuous film of a thickness such that the under layer thereof, when heated from below, will gel before the upper layer has lost its pulp-like consistency, but sufficiently thin that the upper layer may be dried and gelled by heat applied from above, thereby substantially gelling the entire film, and applying heat from below to heat the surface and the under layer, to drive off moisture from such under layer through the still pulp-like upper layer, subsequently applying heat to the upper layer of the film, to eliminate moisture from such upper layer as the latter gels, flaking the resultant film, and thereafter applying heat to the flakes to further reduce the moisture content.

9. A process of dehydrating and preserving applicable to various vegetable materials, having varying tendencies to gel when heated, and by such gelling tending to lock in the moisture, which process comprises producing a pulp of such fruit, spreading such pulp upon a surface in a homogeneous, continuous film of such thickness, with regard to the consistency and gelling characteristics of the particular fruit being treated, that it will initially permit ready escape of moisture from the bottom through the top, but such that the under layer thereof, when heated from below, will gel before the upper layer has lost its pulp-like consistency, but sufficiently thin, again with regard to the gelling characteristics of the particular fruit, that the upper layer may be dried and gelled by heat applied from above, thereby substantially gelling the entire film, and then applying heat from below to heat the surface and the under layer, to drive off moisture from such under layer through the still pulp-like upper layer, and subsequently applying heat to the film from above, to eliminate moisture from the upper layer as the latter gels, without increase of temperature in the under layer during such heating of the upper layer.

10. A process of dehydrating and preserving applicable to vegetable materials, having varying tendencies to gel when heated, and by such gelling tending to lock in the moisture, which process comprises producing a pulp of such fruit, spreading such pulp upon a surface in a homogeneous, continuous film of such thickness, with regard to the consistency and gelling characteristics of the particular fruit being treated that it will initially permit ready escape of moisture from the bottom through the top, but such that the under layer thereof, when heated from below, will gel before the upper layer has lost its pulp-like consistency, but sufficiently thin, again with regard to the gelling characteristics of the particular fruit, that the upper layer may be dried and gelled by heat applied from above, thereby substantially gelling the entire film, and then applying heat from below to heat the surface and the under layer, to drive off moisture from such under layer through the still pulp-like upper layer, and subsequently applying heat to the film from above, to eliminate moisture from the upper layer as the latter gels, meanwhile continuing to heat the under layer from below, but without increase in its temperature.

11. A process of dehydrating and preserving applicable to vegetable materials, having varying tendencies to gel when heated, and by such gelling tending to lock in the moisture, which process comprises producing a pulp of such fruit, spreading such pulp upon a surface in a homogeneous, continuous film of such thickness, with regard to the gelling characteristics of the particular fruit being treated, that when heat is applied to a single surface of such pulp film, such surface becomes gelatinized before the opposite surface of such pulp film has lost its pulp-like consistency, but sufficiently thin, again with regard to the gelling characteristics of the particular fruit, that the remaining ungelled pulp may be dried by heat applied adjacent thereto, thereby gelling the entire film, and then applying heat to heat one surface of the pulp film, to eliminate moisture therefrom, and subsequently applying heat to the opposite ungelled pulp-like layer, to eliminate the moisture from the latter layer as the latter gels.

12. The process defined in claim 11, wherein heating of the first-gelled surface is continued during application of heat to the second surface.

13. A process of dehydrating and preserving applicable to vegetable materials, having varying tendencies to gel when heated, and by such gelling tending to lock in the moisture, which process comprises producing a pulp of such fruit, spreading such pulp in a homogeneous, continuous film of such thickness, with regard to the gelling characteristics of the particular fruit being treated, that when heat is applied to a single surface of such pulp film such surface becomes gelatinized before the opposite surface has lost its pulp-like consistency, but sufficiently thin, again with regard to the gelling characteristics of the particular fruit, that the remaining ungelled pulp may be dried by heat applied adjacent thereto, thereby gelling the entire film, and then applying heat independently to each such surface of the pulp film, to eliminate moisture from each such surface.

CHAUNCEY R. STUNTZ.